United States Patent [19]

Benton et al.

[11] Patent Number: 5,622,739
[45] Date of Patent: Apr. 22, 1997

[54] FEED BLOCK WITH IMPROVED MINERAL DELIVERY

[75] Inventors: Alfred E. Benton, Walnut; Chester D. Beintema, West Covina, both of Calif.

[73] Assignee: K.E.S. Associates, Walnut, Calif.

[21] Appl. No.: 466,264

[22] Filed: Jun. 6, 1995

[51] Int. Cl.$^6$ .............................. A23K 1/18; A23K 1/16; A23K 1/02; A23K 1/175
[52] U.S. Cl. .................. 426/74; 426/2; 426/807; 426/658; 426/515; 426/89; 426/90; 426/96; 426/97; 426/103; 426/138
[58] Field of Search ................ 426/74, 2, 807, 426/658, 515, 89, 90, 96, 97, 103, 138

[56] References Cited

U.S. PATENT DOCUMENTS

| | | | |
|---|---|---|---|
| 991,354 | 5/1911 | Parent | 426/103 |
| 1,796,031 | 3/1931 | Kent | 426/96 |
| 3,961,081 | 6/1976 | McKenzie | 426/658 |
| 4,087,556 | 5/1978 | Harte | 426/97 |
| 4,150,162 | 4/1979 | Goldstein et al. | 426/2 |
| 4,731,249 | 3/1988 | Findley | 426/69 |
| 4,749,578 | 6/1988 | Benton et al. | 426/74 |
| 5,093,128 | 3/1992 | Draguesku et al. | 424/438 |

*Primary Examiner*—Esther Kepplinger
*Assistant Examiner*—Choon P. Koh
*Attorney, Agent, or Firm*—Christie, Parker & Hale, LLP

[57] ABSTRACT

An improved feed block provides discrete portions of mineral supplement and feed supplement in the same feed block. The mineral supplement is provided as an inner package that is surrounded by a shell of feed supplement such as a dehydrated molasses feed supplement. By so providing the two different supplements, the amount of consumption of each can be accurately controlled. Moreover, different feed blocks can be tailored depending on the desired ratio between the two different supplements.

20 Claims, 1 Drawing Sheet

FEED BLOCK WITH IMPROVED MINERAL DELIVERY

FIELD OF THE INVENTION

The field of the invention relates to feed and mineral supplements for use in the raising of cattle, horses, sheep and other livestock.

BACKGROUND OF THE INVENTION

Feed supplements are generally made from molasses and other nutrients and are generally manufactured in the form of either a liquid feed supplement, or a solid block supplement known as a feed block. Mineral supplements are also known and provide salt and other important minerals in either a granular form or in the form of a block. Such supplements are consumed by livestock in order to provide the desired nutrients. The present invention is directed to an improved feed block that combines a high energy feed supplement with a mineral supplement.

Feed and mineral supplements are desirable in that when used to supplement an animal's diet, the animal's productivity can be improved significantly. Productivity includes factors such as weight gain, lactation and reproduction. Feed supplements can also improve an animal's efficiency both by increasing the rate of digestion for the forages consumed and in the improved metabolism of the nutrients provided by the diet. U.S. Pat. Nos. 3,961,081 to McKenzie and 4,749,578 to Benton and Patrick disclose prior art feed blocks and the methods and apparatus for making them. These patents are incorporated herein by reference.

Like feed supplements, mineral supplements are an important consideration in raising domesticated livestock. Mineral supplements are important because, with the exception of salt (sodium chloride), domesticated livestock have generally lost their instinct for most minerals. By ensuring that livestock consume an appropriate amount of minerals, the long term health of the animals can be improved. However, because domesticated animals have generally lost their instinct for minerals, it can be difficult to get the animals to consume the much needed minerals. Consequently, most ranchers either ignore the livestock's need for minerals or use methods that fail to achieve the desired goal other than for salt. While an animal's life is not generally endangered by the lack of mineral supplementation, the animal's overall health, and, therefore, its productivity can be improved by the routine consumption of mineral supplements.

Mineral supplements have been provided, with some success, by combining the desired minerals with salt in either a block or in a granular form that can be consumed by the animals. Because livestock have a natural affinity for salt, the livestock tend to consume the important minerals along with the salt. However, regulating the proper intake of such minerals has often been difficult. In order to regulate their consumption, mineral supplements have also been provided as a part of the mixture in a feed block. While such a supplement has met with some success, especially where low amounts of mineral supplement are desired, where higher amounts of mineral supplement are desired, the resulting feed block is not as palatable as a traditional dehydrated molasses feed block. Consequently, the animals tend not to consume the desired quantity of supplement.

An improved feed block that is capable of providing both a high energy feed supplement and a mineral supplement is desired.

SUMMARY OF THE INVENTION

An improved feed block for livestock including an improved system for delivering minerals to the livestock is provided by the present invention. According to the invention, an inner block or edible container of granular mineral supplement is provided within an outer shell of feed supplement such as a dehydrated molasses-based feed supplement. Preferably, the improved feed block is made by placing a package of granular mineral supplement wrapped in paper such as cardboard or kraft paper in a tub, and pouring a hot mixture of feed supplement around the inner package. When the feed supplement hardens, the resulting feed block can be provided to livestock to supplement their diet.

The feed block is consumed by allowing the livestock to lick it. To some extent, the livestock can select either of the two different supplements for consumption. However, the livestock are prevented from entirely consuming just one of the supplements as the moisture caused by an animals licking the block causes the less desired portion of the block, usually the mineral supplement, to fall over the more desired portion. Thus, the livestock are required to eventually consume both supplements.

The feed blocks of the present invention can be made with varying amounts of each supplement so as to best complement the livestock's primary diet. For example, for livestock that consume fresh green pasture, the ratio of feed supplement to mineral supplement can be lower than for livestock consuming poorer quality feeds found on dry pastures. Similarly, the type and quantity of minerals provided in the inner block as well as the quantity and type of nutrients in the feed supplement can be adjusted for different types of livestock or even for the geographic location of the livestock.

BRIEF DESCRIPTION OF THE DRAWINGS

The invention will be more specifically described in connection with the accompanying drawings in which.

DETAILED DESCRIPTION OF THE INVENTION

Figure 1:
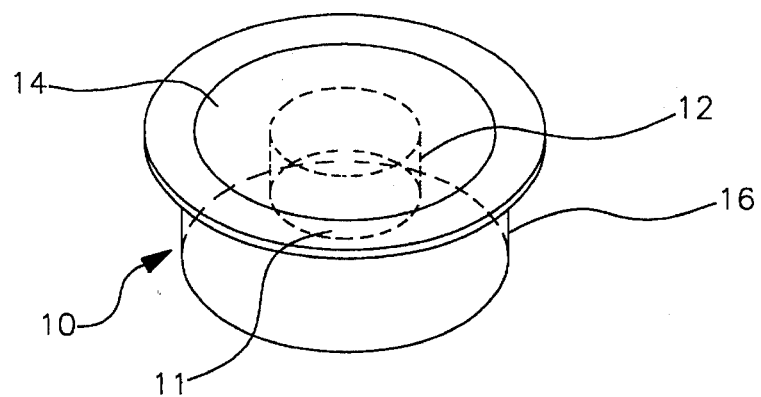
FIG. 1 is a perspective view of a feed block of the present invention with an inner package containing mineral supplement shown in phantom.
Figure 2:
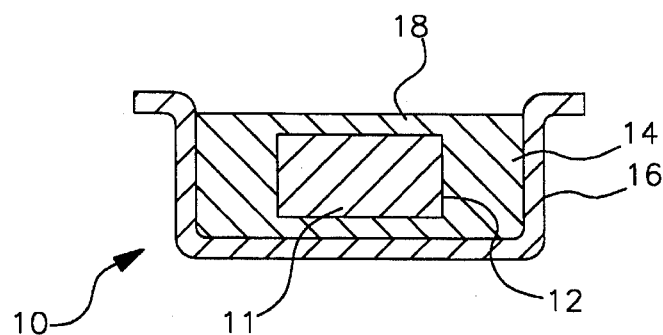
FIG. 2 is a sectional elevation view of one embodiment of a feed block of the present invention.

According to the present invention, a feed block 10 as illustrated in FIGS. 1 and 2, provides both a high energy feed supplement and a mineral supplement in a single feed block. The mineral supplement 11 is provided as an inner cylindrical block or container 12 that is embedded within a shell 14 of feed supplement. Preferably, the feed supplement consists primarily of dehydrated molasses. The feed block can be provided in a tub 16 for convenient delivery to the feedstock.

The mineral supplement can be tailored for the particular livestock for which it is provided. For example, it can be tailored to balance mineral deficiencies and correct mineral interferences for the area in which the livestock are fed. In the preferred embodiment, monosodium phosphate ($NaH_2PO_4$), copper sulfate ($CuSO_4$), manganese sulfate ($MnSO_4$), potassium iodide (KI), sodium selenite ($Na_2SeO_3$), zinc sulfate ($ZnSO_4$) and salt (NaCl) are provided in the mineral supplement. These minerals are combined in the desired proportions and provided as either a block or as granules in an edible package. It is preferred that at least some salt be provided with the mineral supplement as most livestock have a natural affinity for salt. This makes the mineral supplement portion of the feed block more palatable. If the minerals are provided in a granular form, the block is preferably provided in an edible paper wrapper such as one made of kraft paper or cardboard constructed with pure kraft paper. For example, a cardboard tube can be filled with a granular mineral supplement. While paper wrappers are desired as they are inexpensive, other means for wrapping the mineral supplement such as a gel capsule can be provided.

The block or package of mineral supplement can then be placed in a tub and a hot, dehydrated feed supplement can be poured into the tub to surround and encase the mineral supplement. Preferably, the feed supplement is a mixture of molasses and other nutrients such as protein and vitamins. Common sources of protein are fish meal, fish solubles, cottonseed meal, or soybean meal. Examples of such feed supplements are provided in U.S. Pat. No. 4,749,578. While such a feed supplement may contain some minerals, additional minerals are often desired, but cannot be mixed directly into the feed supplement as the palatability of the resulting feed block would be unacceptable to most livestock if too high a concentration of minerals are homogeneously mixed with the feed supplement. Such a mixture can be dehydrated by the methods disclosed in U.S. Pat. No. 4,749,578, and once dehydrated, poured hot into the tub. As it cools, the mixture of feed supplement solidifies into a hard, water resistant block.

The feed block described can then be used to supplement the diet of one or more animals. The livestock consume the feed block by licking it. The inner block of mineral supplement is soon exposed when the thin upper layer 18 of feed supplement is consumed. Similarly, any wrapper containing the mineral supplement must first be either consumed or caused to fall apart by the livestock's saliva. By completely covering the inner block of mineral supplement with a water resistant feed supplement, the shelf life and weather resistance of the feed block can be improved.

One important benefit of a feed block according to the present invention, is that the livestock for which it is made have some choice as to whether they consume the feed supplement or the mineral supplement. For example, if an animal desires the sweet feed supplement, then the outer portion of the exposed surface of the feed block can be consumed. If an animal desires mineral supplement, then the inner portion of the exposed surface of the feed block can be consumed.

However, while the feed block of the present invention allows the animal some choice between supplements, that choice is limited. For example, as is generally the case, an animal will prefer to consume the sweet outer feed supplement. However, as the inner package of mineral supplement is exposed by the consumption of the surrounding feed supplement, the package of mineral supplement, moistened by the saliva of the animals, disintegrates and the mineral supplement spills over onto the feed supplement, forcing the animals to consume the mineral supplement. In effect, the consumption of the palatable feed supplement drives the consumption of mineral supplement. If a block of mineral supplement is provided rather than a package of granular mineral supplement, the moistened mineral supplement will similarly spill over onto the feed supplement if a significant amount of feed supplement is consumed first.

The limited choice provided by the feed block, of the present invention is also beneficial in that it prevents an animal from consuming a large amount of minerals at one time. With prior art mineral supplements, an animal could consume a "slug" of mineral which could adversely affect the animal's digestion.

Thus, by the present invention, the combination of feed and mineral supplements must be consumed in an essentially constant ratio over time, depending on the amount of each that is present. Even though there may be some mixing between the two supplements, they are essentially provided in discrete portions with only slight mixing between them. Furthermore, even if a portion of the mineral supplement spills over onto the feed supplement, the two are still essentially discrete. Thus, any adverse palatability caused by the mixing of feed supplement with mineral supplement is generally avoided. Moreover, while it is preferred that the inner package of mineral supplement includes some salt to improve its palatability, because the animals are required to consume all of the mineral supplement that spills onto the feed supplement, the inclusion of salt is not essential.

It should also be noted that even though the preferred embodiment includes the use of a paper or other wrapper for containing the mineral supplement, such paper will rapidly break apart on exposure to moisture, thus preventing the livestock from consuming only the feed supplement. In selecting an appropriate wrapper, its solubility upon exposure to the livestock's saliva should be considered. As the feed supplement is consumed by being licked by the livestock, the wrapper will become moist. This in turn causes the mineral supplement to get moist and spill over onto the feed supplement preventing a column of mineral supplement of any significant height from forming. Moreover, by using a wrapper made of pure cellulose kraft paper that is highly palatable, the consumption of the wrapper causes the immediate exposure of the mineral supplement.

One important benefit of the feed block of the present invention is that the consumption of feed and mineral supplements can be carefully controlled with a single feed block. In the past, it was generally required that two different supplements or blocks be provided, one for feed supplement and another for mineral supplement. Of course, when two different feed supplements or blocks are used, it is difficult, if not impossible, to be sure that the proper amount of each is consumed.

Another important aspect of the invention is that the precise ratio between feed supplement and mineral supplement can be varied depending on the size and shape of the inner package of mineral supplement with respect to the overall feed block. For livestock that graze on fresh green pasture, less feed supplement is generally required and the mineral supplement and feed supplement can be provided in a weight ratio of about 1:1. For livestock that are fed dry feed, a weight ratio of feed supplement to mineral supplement of as high as 32:1 or more can be provided. Of course, depending on the diet of a particular animal or herd, any particular ratio can be easily provided. The ratio can also be tailored for other considerations such as the local geography which can affect the mineral content of the livestock's diet.

While the feed block has generally been described as a column of mineral supplement encased within a cylindrical shell of feed supplement, many other geometries are also possible. For example, multiple cylindrical columns of feed supplement can be provided in a single feed block. The mineral supplement can also be provided as a column of rectangular or other cross section. Moreover, irregular shapes for the mineral supplement can also be provided. However, it is generally preferred that the cross section of the feed block at a plane at any distance along the height of the feed block provide essentially a constant ratio between the exposed area of feed supplement to the exposed area of mineral supplement to assure the supplements are consumed in the proper ratio.

Figure 3:
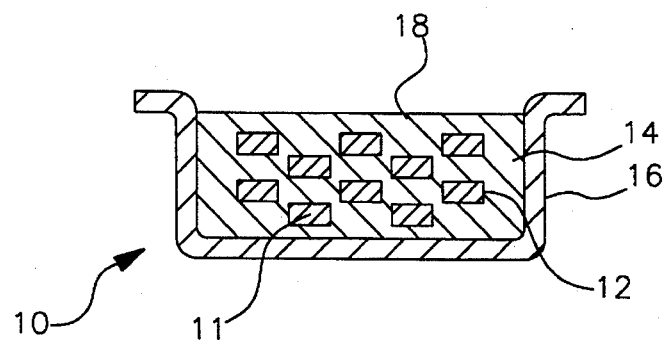
FIG. 3 is a sectional elevation view of another embodiment of a feed block of the present invention.

It has also been determined that the weatherability of the feed blocks of the present invention can be improved by providing multiple packages of mineral supplement in layers and at various locations within the feed block. Such an embodiment is illustrated in FIG. 3. A feed block 10 includes multiple packages of mineral supplement 11, each wrapped in a cardboard or paper wrapper 12 and deposited at different layers within a shell 14 of feed supplement within a tub 16. By this embodiment, the individual packages are uncovered in stages as the feed block is consumed. Since the feed supplement is generally water resistant but the mineral supplement is fairly water soluble, if a feed block of the present invention is left out in the rain, some of the mineral supplement may dissolve and be lost. By using several discrete packages of mineral supplement, only a portion of the mineral supplement will be lost in such inclement weather, the remainder being protected from exposure by the feed supplement.

It should also be recognized that while in the preferred embodiment, a thin layer of feed supplement completely covers the top of the inner block of mineral supplement, the thickness of the layer can vary greatly. If, for some reason, such as a desire to delay the consumption of mineral supplement, or to give the feed block a longer shelf life, the layer of feed supplement over the mineral supplement can be relatively thick. Conversely, if it is desired that the consumption of the mineral supplement be initiated immediately, then no upper layer of feed supplement need be provided above the mineral supplement. In such a feed block, the feed supplement is provided so as to surround the outer wall of mineral supplement without covering the top of the mineral supplement.

The feed block of the present invention is also particularly beneficial for young livestock. For example, calves have a much smaller rumen than do mature cattle. Because of the smaller rumen, the fermentation process that takes place in the rumen is sensitive to large slugs of minerals. In particular, large amounts of minerals can significantly hinder the fermentation process that promotes digestion. In a feed block that includes minerals mixed uniformly throughout a feed supplement, such minerals are introduced to the rumen, thus hindering the fermentation reactions. However, because calves are biologically able to bypass the rumen, they can consume the mineral supplement of the present invention without adversely affecting their overall digestion. For calves and animals up to about two years of age, the feed supplement portion of the present feed block will be digested in the rumen as designed while the consumption of mineral supplement will trigger the closure of the esophageal groove to bypass the rumen to the true stomach without interfering with the fermentation process in the rumen.

It should also be noted that while the embodiment described is a feed block with one or more inner packages of mineral supplement surrounded by an outer shell of feed supplement, numerous other combinations and configurations are possible. For example, the two supplements may be reversed such that an inner block of feed supplement is surrounded by a shell of mineral supplement. Moreover, two different inner packages, one with mineral supplement and another with a different supplement such as a vitamin supplement may be provided, both of which would be surrounded by a shell of feed supplement. In yet another embodiment, a high protein supplement can be provided as an inner block within a shell of dehydrated molasses. Of course, any number of different sizes and shapes for the overall feed block can be provided and all such modifications are intended to be included within the scope of protection which is broadly directed to providing two or more discrete supplements in a single feed block.

What is claimed is:

1. A feed block for consumption by livestock comprising:

a quantity of a first group of nutrients; and an outer shell of a second group of nutrients surrounding the first group of nutrients, wherein the feed block is of a size such that the outer shell is consumed by the livestock licking the outer shell, thereby exposing the first group of nutrients for consumption by the livestock.

2. The feed block of claim 1 wherein the first group of nutrients comprises a mixture of minerals and the second group of nutrients comprises a molasses-based, high-energy feed supplement.

3. The feed block of claim 2 wherein the weight ratio of the second group of nutrients to the first group of nutrients is between about 1 and 32.

4. The feed block of claim 1 further comprising an intermediate paper wrapper for containing the first group of nutrients.

5. The feed block of claim 1 wherein the first group of nutrients is provided in a shape such that, as the livestock consume the feed block, the first and second groups of nutrients are exposed such that the ratio of the amount of the first group of nutrients exposed to the amount of the second group of nutrients exposed is essentially constant.

6. The feed block of claim 1 wherein the first group of nutrients is a solid inner block.

7. The feed block of claim 6 wherein the solid inner block is a cylindrical column.

8. The feed block of claim 7 wherein the solid inner block and outer shell are of essentially the same height.

9. The feed block of claim 7 wherein the solid inner block is shorter than the outer shell.

10. The feed block of claim 1 wherein the first group of nutrients is provided in granules.

11. The feed block of claim 10 wherein the granules are provided in a wrapper.

12. The feed block of claim 11 wherein the wrapper is a paper tube.

13. A feed block for consumption by livestock comprising:

an inner portion of a first group of nutrients;

an intermediate wrapper surrounding the inner portion; and an outer shell of a second group of nutrients surrounding the intermediate wrapper, wherein the feed block is of a size such that the outer shell is consumed by the livestock licking the outer shell, thereby exposing the intermediate wrapper and first group of nutrients for consumption by the livestock.

14. The feed block of claim 13 wherein the intermediate wrapper comprises paper.

15. The feed block of claim 13 wherein the intermediate wrapper comprises a cardboard tube.

16. The feed block of claim 13 wherein the inner portion is a solid inner block.

17. The feed block of claim 13 wherein the inner portion comprises granules of mineral supplement.

18. A feed block for consumption by livestock comprising:
- a first group of nutrients;
- a plurality of packages, each containing a portion of the first group of nutrients; and
- an outer shell of a second group of nutrients surrounding the plurality of packages, wherein the feed block is of a size such that the outer shell is consumed by the livestock licking the outer shell, thereby exposing the plurality of packages and the first group of nutrients for consumption by the livestock.

19. The feed block of claim 18 wherein the first group of nutrients comprises a granular mineral supplement and each of the plurality of packages comprises an amount of the mineral supplement wrapped in paper.

20. The feed block of claim 18 wherein the first group of nutrients comprises a mineral supplement and each of the plurality of packages comprises a solid block of the mineral supplement.

* * * * *